(12) United States Patent
Lehnert et al.

(10) Patent No.: US 10,608,386 B2
(45) Date of Patent: Mar. 31, 2020

(54) SOCKET FOR CONNECTING A TRAILER PLUG CONNECTOR (71) Applicant: Erich Jaeger GmbH & Co. KG, Friedberg (DE)

(72) Inventors: Lawrence J. Lehnert, Canton, MI (US); Johannes Gette, Wolfersheim (DE)

(73) Assignee: Erich Jaeger GmbH + Co. KG, Friedberg (DE)

( * ) Notice: Subject to any disclaimer, the term of this patent is extended or adjusted under 35 U.S.C. 154(b) by 0 days.

(21) Appl. No.: 16/119,563

(22) Filed: Aug. 31, 2018

(65) Prior Publication Data
US 2020/0076139 A1 Mar. 5, 2020

(51) Int. Cl.
*H01R 4/60* (2006.01)
*H01R 13/74* (2006.01)
*B60D 1/64* (2006.01)
*H01R 13/52* (2006.01)

(52) U.S. Cl.
CPC ............ *H01R 13/745* (2013.01); *B60D 1/64* (2013.01); *H01R 13/5213* (2013.01); *H01R 13/5219* (2013.01)

(58) Field of Classification Search
CPC ........................... H01R 24/38; H01R 13/5227
USPC .......................................... 439/35, 206, 545
See application file for complete search history.

(56) References Cited

U.S. PATENT DOCUMENTS

| 4,352,538 A * | 10/1982 | Fowler | H01R 4/245 439/404 |
| 4,793,819 A * | 12/1988 | Berg | H01R 13/5227 174/67 |
| 5,800,188 A * | 9/1998 | Barber | B60D 1/64 220/242 |
| 5,816,643 A * | 10/1998 | Itou | B60L 53/65 296/97.22 |
| 5,924,879 A * | 7/1999 | Kameyama | H01R 13/4538 439/141 |
| 6,019,386 A * | 2/2000 | Morelock | B60D 1/60 280/420 |
| 6,030,242 A * | 2/2000 | Cunningham | H01R 13/6315 439/247 |

(Continued)

FOREIGN PATENT DOCUMENTS

EP 2 456 015 5/2012

*Primary Examiner* — Neil Abrams
(74) *Attorney, Agent, or Firm* — Levy & Grandinetti (57) ABSTRACT

A socket for connecting a trailer plug connector in the outside area of a towing vehicle has a socket housing, a first plug receiving opening, a cover, a harness connector, and a second plug receiving opening. Electrical socket contacts are supported in the socket housing extending into the first receiving opening for mating with a trailer plug connector and into the second plug receiving opening for mating with a harness connector. The harness connector has an outer perimeter lamella seal. The harness connector has terminal openings. A contact terminal connects with one single wire and has a single wire seal surrounding the single wire. The single wire seal abuts and seals an inside wall of the terminal opening. The socket housing includes a drainage opening from the inside of the first plug receiving opening to the outside of the socket housing. A shielding plate with a channel is located below the drainage opening to block water flow from outside into the plug receiving opening.

32 Claims, 7 Drawing Sheets (56) References Cited

U.S. PATENT DOCUMENTS

| | | | | |
|---|---|---|---|---|
| 6,312,285 | B1* | 11/2001 | Berg | H01R 13/74 |
| | | | | 439/545 |
| 6,971,883 | B1* | 12/2005 | Ridge | H01R 13/516 |
| | | | | 439/142 |
| 7,435,125 | B2 | 10/2008 | Cummings et al. | |
| 7,597,587 | B1* | 10/2009 | Duesterhoeft | H01R 13/629 |
| | | | | 439/545 |
| 7,955,085 | B2* | 6/2011 | Rotenberg | H01R 13/516 |
| | | | | 439/35 |
| 8,597,039 | B2* | 12/2013 | Osawa | H01R 13/5227 |
| | | | | 439/205 |
| 8,662,910 | B2* | 3/2014 | Ichio | H01R 13/5208 |
| | | | | 439/206 |
| 8,932,065 | B2* | 1/2015 | Gerling | B60D 1/64 |
| | | | | 439/35 |
| 9,425,544 | B2* | 8/2016 | Murakami | H01R 13/5213 |
| 9,653,842 | B2* | 5/2017 | Savage | H01R 13/5213 |
| 9,819,116 | B1* | 11/2017 | Baughman | H01R 13/5227 |
| 10,027,072 | B1* | 7/2018 | Shaeffer | H01R 24/38 |
| 10,044,133 | B2* | 8/2018 | Wittrock | H01R 13/5227 |
| 10,050,377 | B2* | 8/2018 | Matsuura | H01R 13/5227 |
| 10,320,115 | B2* | 6/2019 | Xiao | H01R 13/5227 |
| 2019/0334283 | A1* | 10/2019 | Di Paola | H01R 13/5224 |

\* cited by examiner

SOCKET FOR CONNECTING A TRAILER PLUG CONNECTOR

FIELD OF THE INVENTION

The invention relates to a socket for connecting a trailer plug connector in the outside area of a towing vehicle, and in particular to 4-, 5- or 8-conductor sockets for trailer towing. These sockets form an open interface in between the user's trailer and the on-board network of a towing vehicle. The invention is in particular related to a socket according to the SAE J1239 standard.

BACKGROUND OF THE INVENTION

Commonly known are 4-conductor electrical systems (sockets) for trailer towing according to the SAE J1239 standard. The SAE standard does not provide water tightness especially when the trailer plug is connected. Water could go through the capillary effect in the main body harness and could so damage car electronic.

Current solutions of SAE J1239 sockets have only an optional rubber cover to protect the contact system. Closing of the socket cover is up to the user and not secured by system component itself. Further, as a measure of water tightness, known sockets have over molded contact wires to improve water protection. In case of service, however, the complete harness has to be exchanged.

In the U.S. Pat. No. 7,435,125 B2 a SAE J1239 type socket is described comprising a body portion including a first and a second connector portion being separated from each other. Both connector portions comprise a cover pivotally connected to the body portion. A cover spring is provided to bias the cover toward a closed config-uration.

The EP 2 456 015 A2 shows another type of a vehicle socket. The socket is equipped with a housing which can be fixed to the motor vehicle and has a contact carrier in one piece with the housing. A hinged cover is provided for a sealing closure of the insertion opening of the socket used for inserting the plug. Contacts are inserted in the contact carrier in such a sealing manner that no moisture from the insertion opening can pass through the contact carrier.

SUMMARY

It is an object of the invention to provide a socket for connecting a trailer plug connector in the outside area of a towing vehicle having water tightness from the socket interface J1239, i.e. an opening for receiving the trailer plug to the wire harness side, even if a plug is connected. It is a further object of the invention to provide a socket having water tightness at the wire harness side. It is another object of the invention to allow water that has entered the socket outlet to escape from the socket despite protecting the socket from water entering.

In this regard, the present disclosure proposes a socket for connecting a trailer plug connector in the outside area of a towing vehicle, having a socket housing; a first plug receiving opening having electrical socket contact terminals designed in the front side of the socket housing for plugging in the trailer plug connector thereby producing an electrical connection; a cover being hinge-connected to the socket housing, said cover sealing off the first plug receiving opening in its closed position and being spring-loaded in the closing direction; a harness connector for connecting the electrical contacts to the towing vehicle harness; a second plug receiving opening designed in the rear side of the socket housing for plugging in the harness connector having the same electrical socket contacts as the first plug receiving opening; wherein the electrical socket contacts are supported in the socket housing extending into the first receiving opening for mating with the trailer plug connector and into the second plug receiving opening for mating with the harness connector; wherein the harness connector has an outer perimeter lamella seal abutting and sealing against an inside wall of the second plug receiving opening when the harness connector is inserted into the second plug receiving opening; wherein the harness connector has terminal openings extending in the axial direction along the plug insertion direction of both the trailer plug connector and the harness connector for receiving harness contact terminals; wherein the harness contact terminal is connectable with one single wire of the towing vehicle harness and has a single wire seal surrounding the single wire connected to the harness contact terminal, the single wire seal abutting and sealing against an inside wall of the terminal opening when the harness contact terminal is received in the terminal opening: wherein the socket housing comprises a drainage from the inside of the first plug receiving opening to the outside of the socket housing allowing any water trapped in the first plug receiving opening after use to drain even with the cover in its closed position.

This ensures water tightness between the first plug receiving opening, i.e. the socket interface, and the second plug receiving opening, i.e. the harness side of the socket, even if a trailer plug is inserted into the first plug receiving opening and the cover is not closed. This is also the case if the trailer plug does not provide sealing of the first plug receiving opening when it is plugged into the socket, due to whatever reason. Water trapped in the socket can also drain to the outside of the socket housing when the trailer plug is plugged in. The advantage is that the sealing and drainage concept of the socket is completely independent of the nature of the plug inserted into the socket outlet.

The modular system using a harness connector allows easy handling for socket exchange in case of a repair service, even in case the socket has to be replaced. In this case, the harness connector is simply pulled out of the second plug receiving opening of the socket to be replaced and plugged into the second plug receiving opening of the new socket. Despite the modularity, water tightness is also achieved from wire harness side though the perimeter lamella seal and the single wire seals surrounding the single wire of the wire harness.

BRIEF DESCRIPTION OF THE DRAWINGS

FIG. 7 shows a sectional view through the shorter side of the harness connector with (a) a slider in a first sliding position allowing movement of the harness contact terminals in the harness connector and (b) the slider in a second sliding position blocking movement of the harness contact terminals in the harness connector.

FIG. 8 shows a sectional view through the longer side of the harness connector with (a) a slider in a first sliding position allowing movement of the harness contact terminals in the harness connector and (b) the slider in a second sliding position blocking movement of the harness contact terminals in the harness connector.

DETAILED DESCRIPTION

Before describing a preferred embodiment according to the proposal with reference to the drawings in detail, a general overview of the proposal is given.

Known trailer socket connectors (sockets) rarely provide a weather resistant solution or easy replacement when needed. Contact terminals become exposed to the elements which causes premature corrosion and prevents function. The SAE standard does not even prescribe a cover for the socket to protect the contact terminals in the socket when no trailer plug is plugged in. Some existing trailer socket connectors for light trailer towing have a cover, however it must be closed manually.

Further, current replacement connectors must cut and splice the electrical wires with the vehicle harness, which can cause additional connection issues and is laborious.

With the proposal, a 4-, 5- or 8-conductor socket (also denoted as trailer socket connector) for connecting a trailer plug connector based on the SAE J1239 standard is provided, using a weather resistant spring loaded cover with an integrated cover seal, in particular a rubber seal, and a double contact system utilizing a detachable harness connector with different types of seals and crimped wire terminal contacts (also denoted as harness contact terminals).

Figure 1:
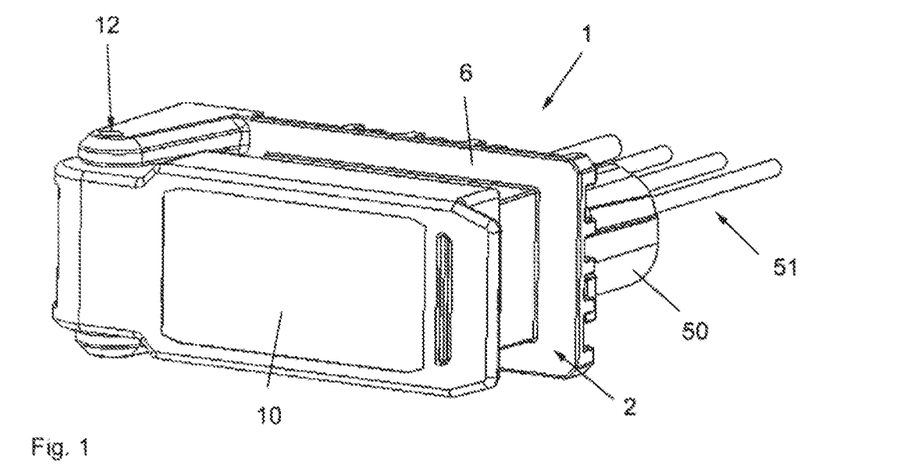
FIG. 1 shows an embodiment of the socket according to the invention in a three-dimensional front view with the cover of the socket closed.

FIG. 1 shows an embodiment of a socket 1 for connecting a trailer plug connector (not shown in the drawings) in the outside area of a towing vehicle in line with the proposal. The socket 1 according to proposal might be mounted in the outside area of a towing vehicle.

The invention shall not be limited to this exemplary embodiment shown in the drawings. Without departing from the scope of protection, the one skilled in the art might realize the features as described below in a different way and/or different combination in line with his skills.

The proposed socket 1 has a socket housing 2 carrying all components of the socket 1. The socket housing 2 may be made of plastics and produced in one piece, e.g. by injection molding.

The socket housing 2 forms a first plug receiving opening 3 (best seen in FIG. 2) having electrical socket contact terminals 4 designed in the front side of the socket housing 2 for plugging in the trailer plug connector thereby producing an electrical connection.

Figure 2:
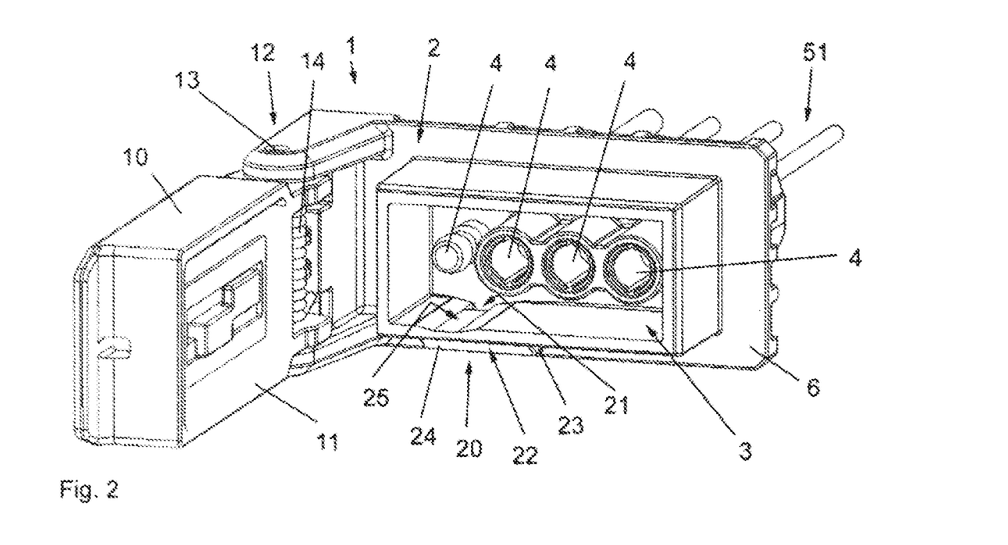
FIG. 2 shows the socket in the view according to FIG. 1 with the cover of the socket opened.

A cover 10 is hinge-connected to the socket housing 2. The cover 10 in its closed position is sealing the first plug receiving opening 3 and being spring-loaded in the closing direction, i.e. biased to the closed position as shown in FIG. 1. This ensures water tightness if no trailer plug connector is plugged in. FIG. 2 shows the cover 10 in its opened position in which the cover 10 opens the first plug receiving opening 3 for introducing the trailer plug connector.

Figure 3:
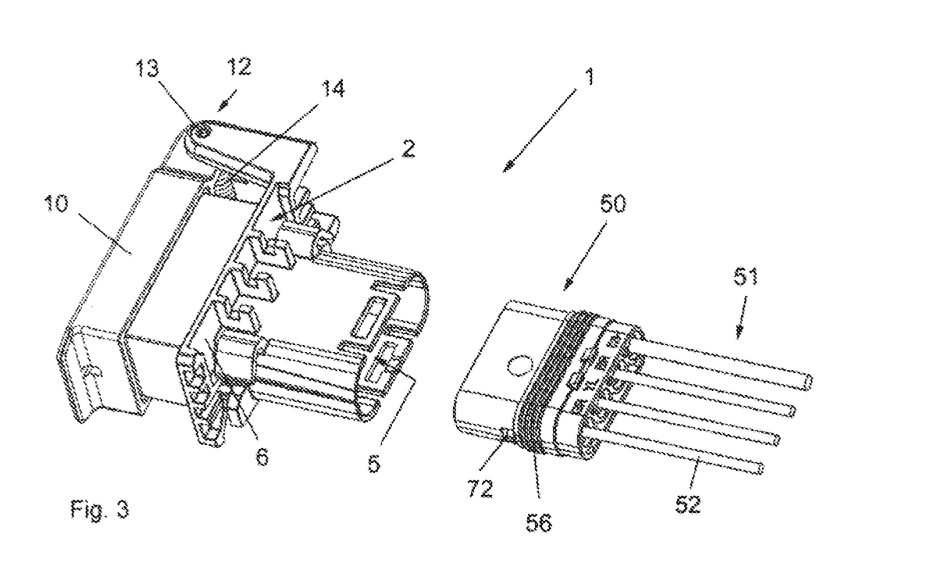
FIG. 3 shows the socket in a three-dimensional rear view with the harness connector disconnected from the socket housing.

A harness connector 50 (see FIG. 3) is part of the socket 1 and can detachably mounted to the socket housing 2 for connecting the electrical socket contact terminals 4 to the towing vehicle harness 51 comprising in particular one single wire 52 of the towing vehicle harness 51 for each of the socket contact terminals 4.

For mounting, the socket housing 2 comprises a second plug receiving opening 5 designed in the rear side of the socket housing 2 for plugging in the harness connector 50. The second plug receiving opening 5 has the same electrical socket contact terminals 4 as the first plug receiving opening 3. The harness connector 50 is held and secured in the second plug receiving opening 5 by a snap connection not described in detail, but shown in FIG. 3.

The harness connector 50 has terminal openings 54 (see FIG. 4) extending in the axial direction along the plug insertion direction of both the trailer plug connector and the harness connector 50 for receiving harness contact terminals 53.

Figure 4:
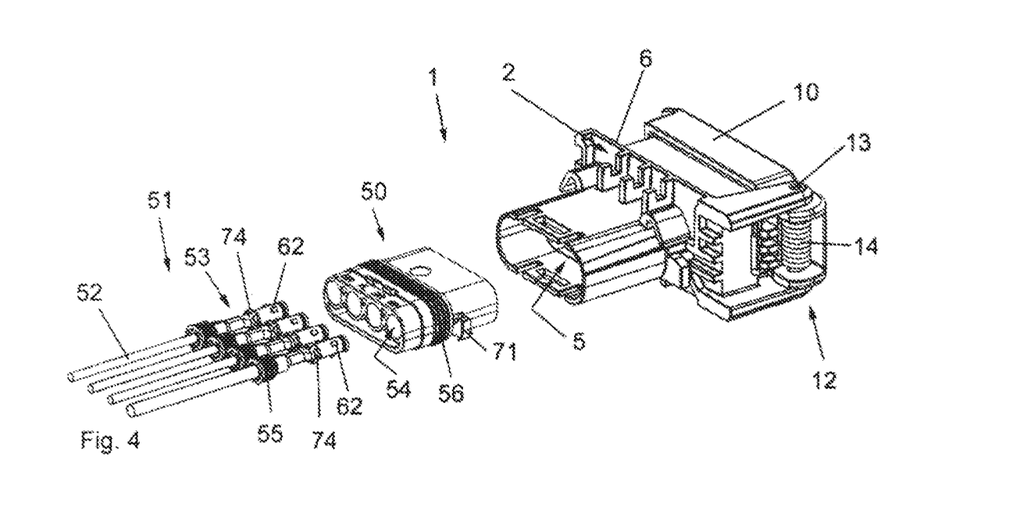
FIG. 4 shows the socket in a three-dimensional exploded view with the socket housing, with the harness connector and the harness contact terminals connected to single wires of the towing vehicle harness.

Each of the harness contact terminals 53 is connectable with one single wire 52 of the towing vehicle harness 51 and has a single wire seal 55 surrounding the single wire 52 connected to the harness contact terminal 53. The single wire seal 55 is abutting and sealing against an inside wall of the terminal opening 54 when the harness contact terminal 53 is received in the terminal opening 54.

Further, the harness connector 50 has an outer perimeter lamella seal 56 abutting and sealing against an inside wall of the second plug receiving opening 5 when the harness connector 50 is inserted into the second plug receiving opening 5.

These sealing features ensure water tightness from the rear side (harness side) of the socket 1.

According to an important aspect of the proposal, the socket housing 2 comprises a drainage 20 from the inside of the first plug receiving opening 3 to the outside of the socket housing 2 allowing any water trapped in the first plug receiving opening after use to drain even with the cover 10 in its closed position.

This is important, as sometimes water enters into the inside of the first plug receiving opening 3. This might occur during use of the socket 1 if a trailer plug connector is plugged into the socket but does not seal against the side walls of the first plug receiving opening 3. This might be due to a missing (the standard JAE 1239 does not provide any seal) or damaged plug seal. Due to the proposed drainage 20, such water flow out of the first plug receiving opening 3 during use or with the cover 10 closing the first plug receiving opening 3 after use.

Figure 5:
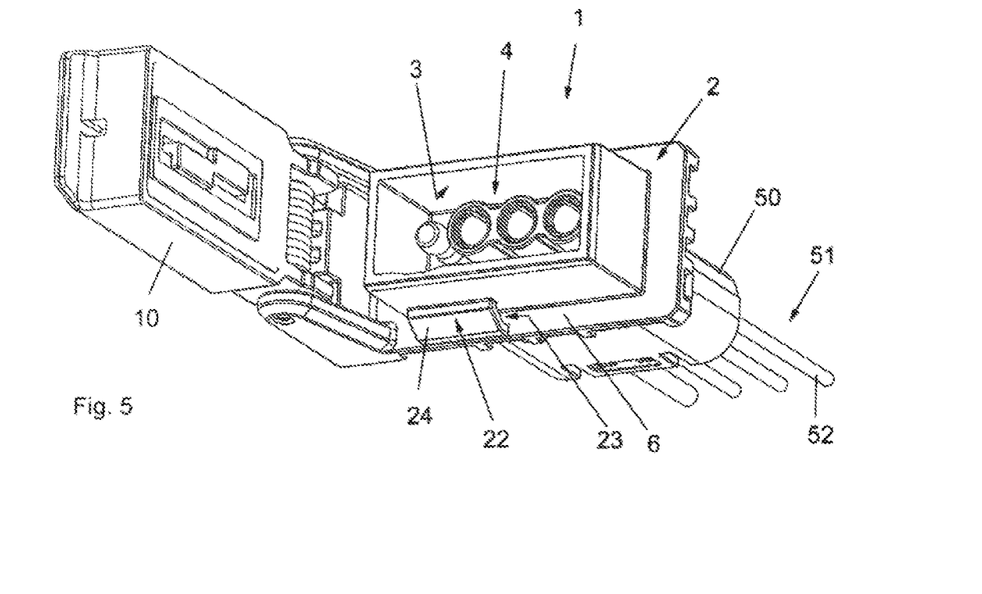
FIG. 5 shows the socket in the view similar to FIG. 2 but in an inclined manner to show the drainage of the socket.

Certain advantageous aspects of the drainage 20 are explained in the following with respect in particular to FIGS. 2, 5 and 6. It is clear to the one skilled in the art that not all of the features are necessary for realizing the proposed drainage 20. Thus, some of the features can be omitted and/or amended by the skilled person without departing from the invention.

The drainage 20 has a through opening 21 in the side wall of the first plug receiving opening 3 of the socket housing 2 (see FIG. 2) and an adjoining channel 22, the channel 22 connecting the through opening 21 with a water outlet opening 23 of the drainage 20 in the socket housing 2. The channel 22 may be formed by a shielding plate 24 connecting the side wall of the first plug receiving opening 3 and a base plate 6 of the plug receiving opening 3, this base plate 6 extending outwards of the plug receiving opening 3 as kind of a flange of the socked housing 2. This base plate 6 of the plug receiving opening 3 may be aligned perpendicular to the side wall of the first plug receiving opening 3, and the shielding plate 24 connects the side wall and the base plate 6 to form the channel 22, said channel 22 having, for example, a triangular form in its cross section.

The shielding plate 24 and the channel 22 shield the through opening 21 and prevent water from flowing into the through opening 21 and the first plug receiving opening 3 from outside.

The channel 22 may have two water outlet openings 23 at its opposed ends so that water can flow through the channel 22 and exit at one end of the channel 22 through one or the other of the water outlet openings 23 without entering the through opening 21.

A preferred appropriate mounting of the socket 1 is accordingly such that the through opening 21 is disposed vertically above the shielding plate 24 and the channel 22 runs horizontally if the towing vehicle is disposed (standing or moving) evenly on a horizontal surface. Thus, with the towing vehicle orientated horizontally, no water will enter into the channel 22.

If—with such appropriate mounting of the socket 1—the towing vehicle is disposed on an inclined surface, water may flow at the higher of the two water outlet openings 23 into the channel 22. However, as the through opening 21 is still positioned at the top of the channel 22, the water will flow through the channel 22 and exit at the other (lower) of the two water outlet openings 23 without flowing through the through opening 21 into the first plug receiving opening 3.

Preferably, the through opening 21 in the side wall of the first plug receiving opening 3 is disposed in the middle of the channel 22 and/or adjacent to the base plate 6 of the socket housing 2 (or of first plug receiving opening 3) in the side wall of the first plug receiving opening 3.

To facilitate the outflow of water from first plug receiving opening 3, the side wall of the first plug receiving opening 3 may be thinner in the area adjacent to the through opening 21. Thus, the side wall may have a—in cross-section trapezoidal—recess 25 which extends from the free edge of the first plug receiving opening 3 in the insertion direction of the trailer plug connector to the base plate 6 of the socket housing 2, the through opening 21 being provided in the smaller of the parallel sides of the trapezoid. In the preferred appropriate mounting of the socket 1, the trapezoid is collecting the water in the trapezoidal recess 25 and thus facilitates the drainage of the water if the socket 1 is installed in the appropriate orientation as described before.

In the example shown, four socket contact terminals 4 are provided, and all socket contact terminals 4 are disposed in one single line. In another embodiment according to the invention, five contact terminals 4 or any other number of socket contact terminals 4, for example eight contact terminals 4, may be provided according to the respective needs, for example in one or two lines. Also the arrangement of the socket contact terminals 4 in the first plug receiving opening may be different. It may be provided to arrange two lines of contact terminals, for example two lines with four or five contact terminals each.

Figure 6:
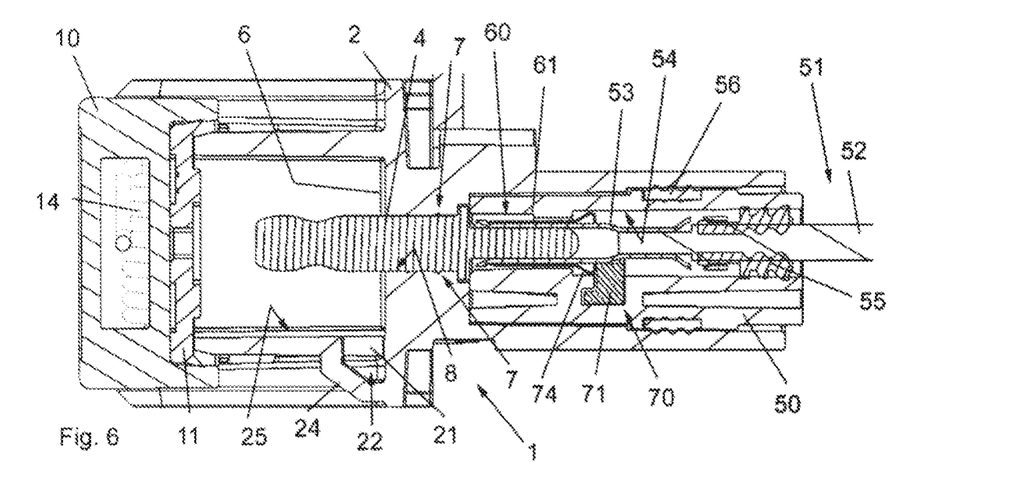
FIG. 6 shows a sectional view through the shorter sides of the socket along the longitudinal axis.

As best seen in FIG. 6, the socket contact terminals 4 may be molded or press-fitted into terminal openings 8 of the socket housing 2 for obtaining a waterproof assembly and mating both the trailer plug connector or the harness connector. For ensuring a 100% water barrier between the first and the second plug receiving opening 3, 5, the socket contact terminals 4 have a perimeter profile 7 protruding from the outer circumference of the contact terminals 4. Thus perimeter profile 7 engages with the terminal openings 8 to give a tight connecting leading to both, water tightness and a safe hold in the opening 8.

The hinge connected cover 10 has an integrated cover seal 11 which, in the closed position of the cover 10, abuts the cover seal 11 against the free edge of the first plug receiving opening 3 (FIG. 6). Preferably, the integrated cover seal 11 is made of an elastomer, such as a synthetic rubber as the UV-resistant ethylene propylene diene monomer (EPDM) rubber, for example.

A hinge 12 of the hinge-connected cover 10 my comprise a hinge pin 13 passing through respective hinge openings in the socket housing 2 and the cover 10 and a hinge spring 14 designed as a torsion spring, which is arranged around the hinge pin 13 for spring loading the cover 10 in the closing direction with one end of the torsion spring 14 supported by the socket housing 2 and another end of the torsion spring 14 supported by the cover 10 so that the cover 10 is biased in the closing direction in its closed position. The cover 10 may be hinge-connected to one of the shorter sides of the plug housing 2, if any.

According to a further aspect of the proposal, the harness connector 50 may provide a primary locking mechanism 60 for securing the harness contact terminals 53 in the harness connector 50, the primary locking mechanism 60 comprising a latching projection 61 in the terminal openings 54 of the harness connector 50 (see FIG. 6) and spring-loaded latching tabs 62 (see FIG. 4) on the outer circumference of the harness connector terminal 53 such that the spring-loaded latching tabs 62 are pressed together by the latching projection 61 in the terminal opening 54 when the harness contact terminal 53 is inserted and snap back behind the latching projection 61 after insertion. Then, the harness contact terminal 53 is secured against axial movement in the direction of the rear side of the harness connector, i.e. towards the vehicle harness 51.

According to another advantageous aspect of the proposal, the harness connector 50 may—alternatively or additionally—provide a secondary locking mechanism 70 for securing the harness contact terminals 53 in the harness connector 50, the secondary locking mechanism 70 comprising a slider 71 shiftable in the harness connector 50 in a direction perpendicular to the plug insertion direction.

Figure 7A:
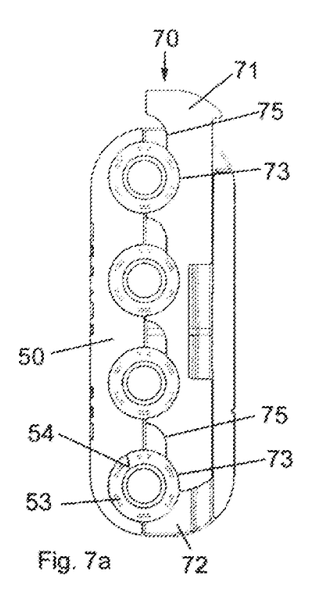
Figure 8A:
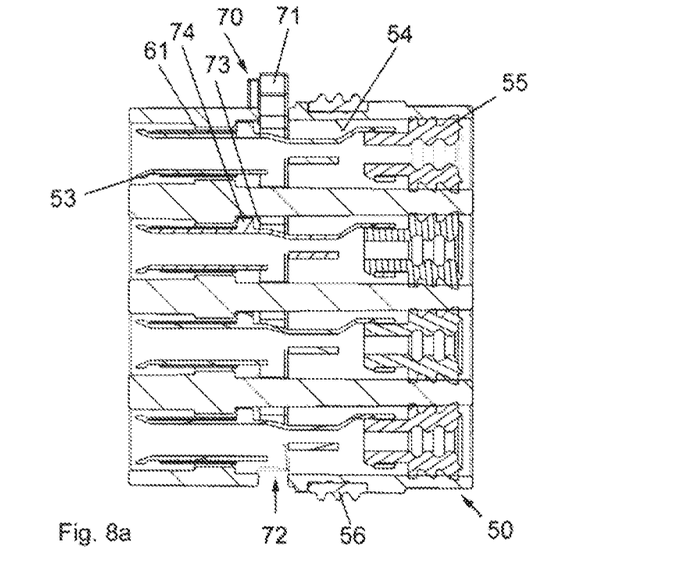

The slider 71 has a first sliding position (shown in the FIGS. 7a and 8a) in which movement of the harness contact terminals 53 in the terminal openings 54 in the plug insertion direction is not blocked. This first sliding position is used for inserting the harness contact terminals 53 each connected to one harness wire 52 into the harness connector 50.

Figure 7B:
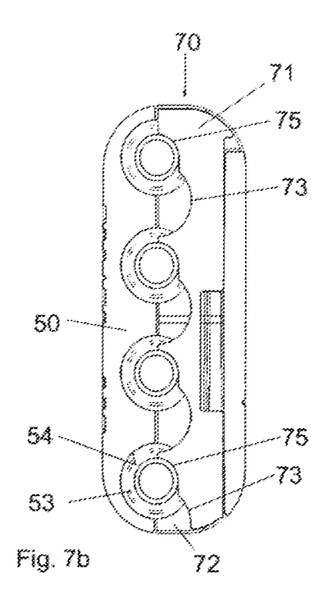
Figure 8B:
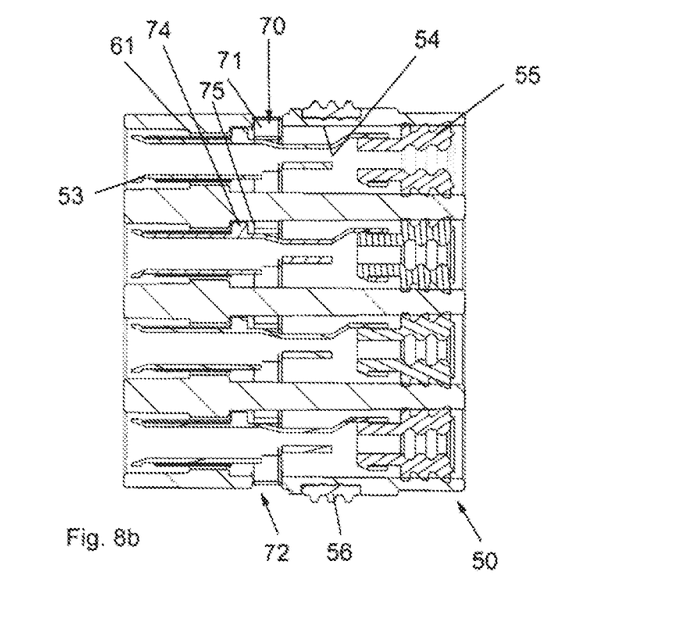

Accordingly, the slider 71 has a second sliding position (shown in the FIGS. 7b and 8b) in which movement of the harness contact terminals 53 in the terminal openings 54 in the plug insertion direction is blocked. This second sliding position is used for securing the harness contact terminals 53 in the harness connector 50 against an axial movement in the plug insertion direction towards the rear side of the harness connector 50.

According to an optional advantageous aspect according to the proposal, the slider 71 is guided in a hole 72 of the harness connector 50 extending in one line along all terminal openings 54 (as can be seen in FIGS. 7 and 8).

In the first sliding position, the slider 71 stands out of the opening 72 above the lateral circumference of the harness connector 50 and thus prevents the harness connector 50 from being inserted into the second plug receiving opening 5 of the socket housing. This ensures that the harness contact terminals 53 are secured against axial movement in the harness connector 50 before connecting the vehicle harness 51 to the socket 1.

In the second sliding position, the slider 71 is entirely received in the hole 72 of the harness connector 50. In this sliding position, the harness contact terminals 53 are secured against axial movement, and the harness connector 50 can be inserted into the second plug receiving opening 5 of the socket housing 2.

In one specific embodiment of the proposal, shown by way of example only and realizing a preferred solution, the slider 71 has a recess 73 (see FIG. 7b) for each of the harness contact terminals 53, the recess 73 being disposed in the first sliding position such that the harness contact terminal 53 can be moved through the recess 73 when the harness contact terminal 53 is moved in the plug insertion direction thereby allowing axial movement of the harness contact terminals 53. This sliding position is shown FIG. 7a in which the recess 73 is disposed around the outer circumference of the harness contact terminals 53.

In the second sliding position (shown in FIG. 7b), the recess 73 is disposed such that the harness contact terminal 53 abuts with a projection 74 (see FIGS. 4 and 6) of the harness contact terminal 53 against an edge 75 of the recess 73 in the slider 71 when the harness contact terminal 53 is to be moved in the plug insertion direction thereby blocking movement of the harness contact terminals 53 The projection 74 is formed, for example, by guide tabs protruding laterally from the harness contact terminal, which are gripped by edge 75 of the slider 71 in the second sliding position. In the first sliding position of the slider 71, in contrast, these guide tabs can be pushed through the recess 73 in the slider 71.

As will be understood by the one skilled in the art, the primary locking mechanism 60 and/or the secondary locking mechanism 70 may be optional features of the socket 1 according to the proposal.

Figure 10:
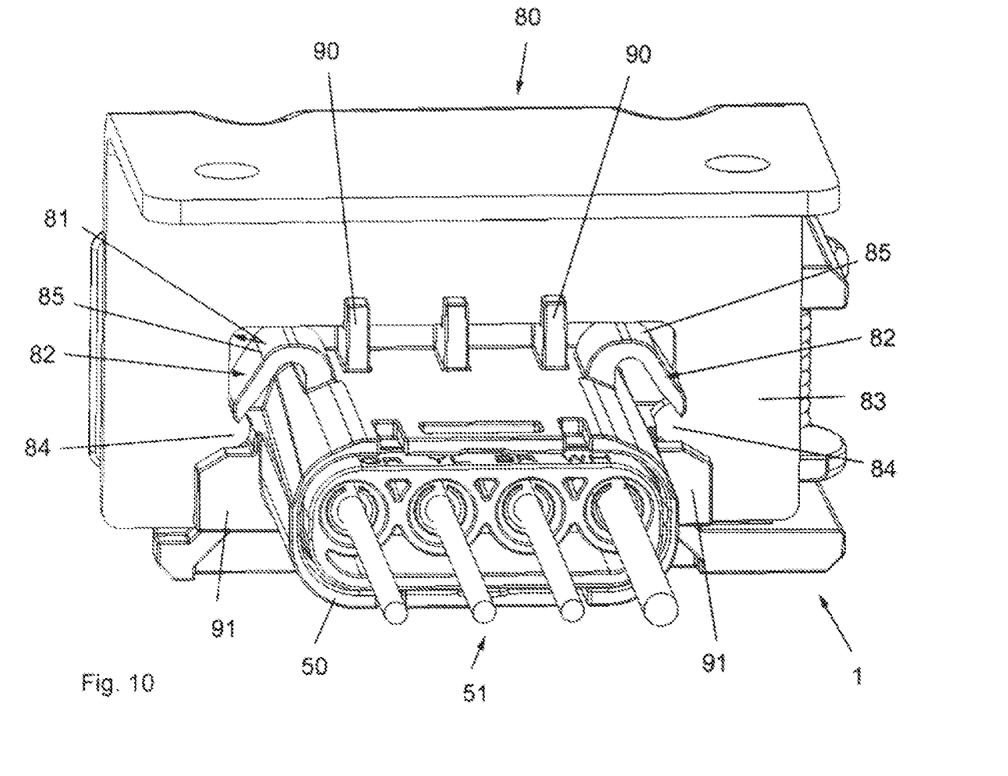
FIG. 10 shows the socket in the view of FIG. 9 and dipped into a mounting bracket.

According to another, also optional, aspect of the proposal, the socket housing 2 of the socket 1 can affix to a provided mounting bracket 80 with a recess 81 (FIG. 10). The mounting bracket 80 may also be part of the socket 1 and be sold together with the socket 1, or separately.

For affixing, the socket housing 2 may incorporate in line with a further optional aspect of the proposal flexible clips 82 for attachment of the socket 1 to the recess 81 of the mounting bracket 80. Accordingly, the mounting bracket 80 may comprise a plate 83, the recess 81 in the mounting bracket 80 being in the plate 83 open to one side in the plate 83. This allows the socket 1 to be inserted from this side to the mounting bracket 80, and more specifically into the recess 81. The recess 81 in the mounting bracket may have retention stub features 84 against which the flexible clips 82 press to hold the socket 1 to the mounting bracket 80 (FIG. 10).

Figure 9:
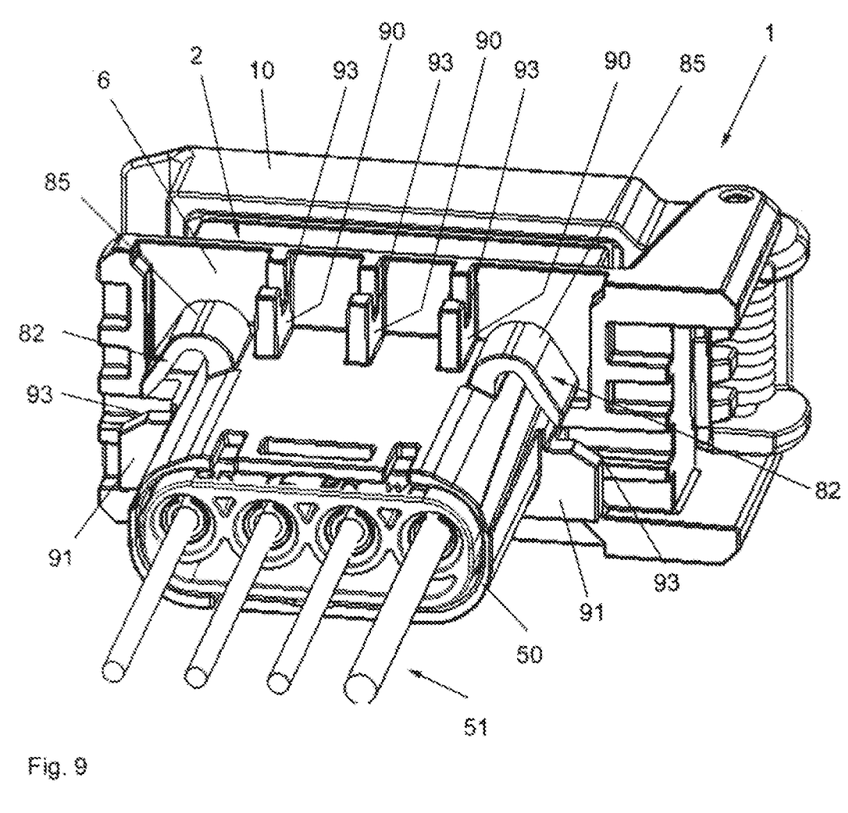
FIG. 9 shows the socket in a three-dimensional rear view with the harness connector inserted into the second plug in opening of the socket housing.

Further, the socket housing 1 may have retaining tabs 90, 91 for guiding the socket housing 2 in the recess 81 of the mounting bracket 80, the retaining tabs 90, 91 comprising guide slots 93 for engaging the edge of the recess 81 in the mounting bracket 80 (FIG. 9). The retaining tabs 90, 91 may be positioned on the outside of the side wall of the second plug receiving opening 5, in particular adjacent to the base plate 6 of the socket housing 2.

According to an aspect of the proposal, two of the retaining tabs 91 are positioned at opposing sides of the second plug receiving opening 5 with the guide slots 93 open in opposing directions. These two retaining tabs 91 are in particular positioned at opposed shorter sides of the second plug receiving opening 5.

At least two, in particular three, of the retaining tabs 90 may be positioned at one same side of the second plug receiving opening 5 with the guides slots 93 open in the same direction. These two or three retaining tabs 90 are in particular positioned at one of the longer sides of the second plug receiving opening 5. These retaining tabs 90, 91 guide the socket 1 in the mounting bracket 80.

In line with one specific example of the proposal, two flexible clips 82 may be provided, each of which being disposed between one and the other of the two retaining tabs 91, respectively, positioned at the opposing sides of the second plug receiving opening 5 and the two or three retaining tabs 90 at the one same side of the second plug receiving opening 5. This is evident from FIG. 9 or 10. Preferably, each of the flexible clips 82 is disposed at a corner of two sides of the second plug receiving opening 5. Each of the flexible clips 82 may have a curved spring arm 85, whereby the spring arms 85 of the flexible clips 82 are sprung and directed in opposite directions along the longer side of the second plug receiving opening 5.

According to a possible and preferred design of the proposal, the socket housing 2, the first plug receiving opening 3 and the second plug receiving opening 5 may have a basically rectangular form with two longer sides and two shorter sides.

What is claimed is:

1. A socket for connecting a trailer plug connector in the outside area of a towing vehicle, having
   a socket housing;
   a first plug receiving opening having electrical socket contact terminals de-signed designed in the front side of the socket housing for plugging in the trailer plug connector thereby producing an electrical connection;
   a cover being hinge-connected to the socket housing, said cover sealing off the first plug receiving opening in its closed position and being spring-loaded in the closing direction;
   a harness connector for connecting the electrical socket contact terminals to the towing vehicle harness;
   a second plug receiving opening designed in the rear side of the socket housing for plugging in the harness connector having the same electrical socket contacts as the first plug receiving opening;
   wherein the electrical socket contacts are supported in the socket housing extending into the first receiving opening for mating with the trailer plug connector and into the second plug receiving opening for mating with the harness connector;
   wherein the harness connector has an outer perimeter lamella seal abutting and sealing against an inside wall of the second plug receiving opening when the harness connector is inserted into the second plug receiving opening;
   wherein the harness connector has terminal openings extending in the axial direction along the plug insertion direction of both the trailer plug connector and the harness connector for receiving harness contact terminals;
   wherein the harness contact terminal is connectable with one single wire of the towing vehicle harness and has a single wire seal surrounding the single wire connected to the harness contact terminal, the single wire seal abutting and sealing against an inside wall of the terminal opening when the harness contact terminal is received in the terminal opening;

wherein the socket housing comprises a drainage from the inside of the first plug receiving opening to the outside of the socket housing;

wherein the drainage has a through opening in a side wall of the first plug receiving opening of the socket housing and an adjoining channel, the channel connecting the through opening with a water outlet opening of the drainage in the socket housing;

wherein the channel is formed by a shielding plate connecting the side wall of the first plug receiving opening and a base plate of the plug receiving opening.

2. The socket according to claim 1, wherein the base plate of the plug receiving opening is aligned perpendicular to the side wall of the first plug receiving opening and the shielding plate connects the side wall and the base plate to the channel, said channel having a triangular form in its cross section.

3. The socket according to claim 1, wherein the channel has two water outlet openings at its opposed ends.

4. The socket according to claim 1, wherein the through opening in the side wall of the first plug receiving opening is disposed in the middle of the channel.

5. The socket according to claim 1, wherein the side wall of the first plug receiving opening is thinner in the area adjacent to the through opening.

6. The socket according to claim 5, wherein the side wall has a recess with trapezoidal cross-section, which extends from the edge of the first plug receiving opening in the insertion direction of the trailer plug connector to a base plate of the socket housing, the through opening being provided in the smaller of the parallel sides of the trapezoid.

7. The socket according to claim 1, wherein the through hole is disposed adjacent to a base plate of the socket housing in the side wall of the first plug receiving opening.

8. The socket according to claim 1, wherein all socket contact terminals are disposed in one single line.

9. The socket according to claim 8, wherein four or five socket contact terminals are provided.

10. The socket according to claim 1, wherein the socket contact terminals are molded or press-fitted into terminal openings of the socket housing.

11. The socket according to claim 10, wherein the socket contact terminals have a perimeter profile.

12. The socket according to claim 1, wherein the hinge connected cover has an integrated cover seal which, in the closed position of the cover, abuts the cover seal against the edge of the first plug receiving opening.

13. The socket according to claim 12, wherein the integrated cover seal is made of an elastomer.

14. The socket according to claim 1, wherein the harness connector provides a secondary locking mechanism for securing the harness contact terminals in the harness connector, the secondary locking mechanism comprising:

a slider shiftable in the harness connector in a direction perpendicular to the plug insertion direction;

wherein the slider has a first sliding position in which movement of the harness contact terminals in the terminal openings in the plug insertion direction is not blocked;

wherein the slider has a second sliding position in which movement of the harness contact terminals in the terminal openings in the plug insertion direction is blocked.

15. The socket according to claim 14, wherein the slider has a recess for each of the harness contact terminals, the recess being disposed:

in the first sliding position such that the harness contact terminal can be moved through the recess when the harness contact terminal is moved in the plug insertion direction; and in the second sliding position such that the harness contact terminal abuts with a projection of the harness contact terminal against an edge of the recess in the slider when the harness contact terminal is moved in the plug insertion direction.

16. The socket according to claim 14, wherein the slider is guided in a hole of the harness connector extending in one line along all terminal openings, wherein:

the slider is in the second sliding position entirely received in the hole of the harness connector; and the slider stands in the first sliding position out of the opening above the lateral circumference of the harness connector and thus prevents the harness connector from being inserted into the second plug receiving opening.

17. The socket according to claim 1, wherein the harness connector provides a primary locking mechanism for securing the harness contact terminals in the harness connector, the primary locking mechanism comprising:

a latching projection in the terminal openings of the harness connector and spring-loaded latching tabs on the outer circumference of the harness connector terminal such that the spring-loaded latching tabs are pressed together by the latching projection in the terminal opening when the harness contact terminal is inserted and snap back behind the latching projection after insertion.

18. The socket according to claim 1, wherein the socket housing is affixable to a provided mounting bracket with a recess; and incorporates flexible clips for attachment of the socket to the recess of the mounting bracket.

19. The socket according to claim 18, wherein:

the mounting bracket comprises a plate, the recess in the mounting bracket being in the plate open to one side in the plate;

the recess in the mounting bracket has retention stub features against which the flexible clips press to hold the socket to the mounting bracket.

20. The socket according to claim 18, wherein the socket housing has retaining tabs for guiding the socket housing in the recess of the mounting bracket, the retaining tabs comprising guide slots for engaging the edge of the recess in the mounting bracket.

21. The socket according to claim 20, wherein the retaining tabs are positioned on the outside of the side wall of the second plug receiving opening.

22. The socket according to claim 21, wherein two of the retaining tabs are positioned at opposing sides of the second plug receiving opening with the guides slots open in opposing directions.

23. The socket according to claim 21, wherein at least two of the retaining tabs are positioned at one same side of the second plug receiving opening with the guides slots open in the same direction.

24. The socket according to claim 22, wherein two flexible clips are provided, each of which being disposed between one and the other, respectively, of the two retaining tabs positioned at the opposing sides of the second plug receiving opening and the retaining tabs at the one same side of the second plug receiving opening.

25. The socket according to claim 24, wherein each of the flexible clips is disposed at a corner of two sides of the second plug receiving opening.

26. The socket according to claim 1, wherein the socket housing, the first plug receiving opening and the second plug receiving opening have a rectangular form with two longer sides and two shorter sides.

27. The socket according to claim 25, wherein each of the flexible clips has a curved spring arm, whereby the spring arms of the flexible clips are sprung and directed in opposite directions along the longer side of the second plug receiving opening.

28. The socket according to claim 26, wherein the cover is hinge-connected to one of the shorter sides of the plug housing.

29. The socket according to claim 1, wherein the hinge of the hinge-connected cover comprises
a hinge pin passing through respective hinge openings in the socket housing and the cover, and
a hinge spring designed as a torsion spring, which is arranged around the hinge pin for spring loading the cover in the closing direction with one end of the torsion spring supported by the socket housing and another end of the torsion spring supported by the cover so that the cover is biased in the closing direction in the closed position.

30. The socket according to claim 23, wherein two flexible clips are provided, each of which being disposed between one and the other, respectively, of the two retaining tabs positioned at the opposing sides of the second plug receiving opening and the retaining tabs at the one same side of the second plug receiving opening.

31. The socket according to claim 30, wherein each of the flexible clips is disposed at a corner of two sides of the second plug receiving opening.

32. The socket according to claim 26, wherein two flexible clips are provided, each of the flexible clips has a curved spring arm, whereby the spring arms of the flexible clips are sprung and directed in opposite directions along the longer side of the second plug receiving opening.

* * * * *